United States Patent
Shim et al.

(10) Patent No.: US 9,041,895 B2
(45) Date of Patent: May 26, 2015

(54) DISPLAY APPARATUS HAVING SPACERS WITH DIFFERENT HEIGHTS AND DIFFERENT UPPER AND LOWER SURFACE AREAS

(71) Applicant: SAMSUNG DISPLAY CO., LTD., Yongin, Gyeonggi-Do (KR)

(72) Inventors: YiSeop Shim, Suwon-si (KR); Soo-Hye Ryu, Yongin-si (KR); Chang-Soon Jang, Seoul (KR); Chul Huh, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 145 days.

(21) Appl. No.: 13/705,890

(22) Filed: Dec. 5, 2012

(65) Prior Publication Data

US 2014/0009730 A1    Jan. 9, 2014

(30) Foreign Application Priority Data

Jul. 3, 2012   (KR) .......................... 10-2012-0072340

(51) Int. Cl.
G02F 1/1339 (2006.01)
G02F 1/1335 (2006.01)
G02F 1/01 (2006.01)

(52) U.S. Cl.
CPC .......... *G02F 1/13394* (2013.01); *G02F 1/0107* (2013.01); *G02F 1/133512* (2013.01); *G02F 2001/13396* (2013.01)

(58) Field of Classification Search
CPC .................. G02F 1/13394; G02F 2001/13396; G02F 1/133512

USPC .......................................... 349/155, 157, 110
See application file for complete search history.

(56) References Cited

U.S. PATENT DOCUMENTS

| | | | |
|---|---|---|---|
| 6,287,733 B1 * | 9/2001 | Miyazaki et al. | 430/7 |
| 7,345,731 B2 | 3/2008 | Sumi et al. | |
| 7,952,681 B2 | 5/2011 | Shen | |
| 8,081,286 B2 | 12/2011 | Kim et al. | |
| 2003/0025868 A1 * | 2/2003 | Hiroshima et al. | 349/156 |
| 2003/0048403 A1 * | 3/2003 | Satoh | 349/156 |
| 2003/0058388 A1 * | 3/2003 | Nakayoshi et al. | 349/113 |
| 2004/0135945 A1 * | 7/2004 | Choi et al. | 349/114 |
| 2004/0169797 A1 | 9/2004 | Fujita et al. | |
| 2005/0099581 A1 * | 5/2005 | Inoue et al. | 349/157 |
| 2007/0002263 A1 * | 1/2007 | Kim et al. | 349/156 |
| 2007/0126793 A1 * | 6/2007 | Yamakado et al. | 347/43 |
| 2007/0126973 A1 * | 6/2007 | Ikeda et al. | 349/155 |
| 2010/0195010 A1 * | 8/2010 | Kim et al. | 349/38 |
| 2011/0299002 A1 * | 12/2011 | Won et al. | 349/43 |
| 2012/0019748 A1 | 1/2012 | Kim et al. | |
| 2012/0113343 A1 * | 5/2012 | Konno et al. | 349/39 |

FOREIGN PATENT DOCUMENTS

| | | |
|---|---|---|
| JP | 4661090 B2 | 3/2011 |
| JP | 2011186279 A | 9/2011 |
| JP | 2012003149 A | 1/2012 |

(Continued)

*Primary Examiner* — Michael Caley
(74) *Attorney, Agent, or Firm* — Cantor Colburn LLP

(57) ABSTRACT

A display apparatus includes a lower substrate, an upper substrate, a spacer and an image display layer. The spacer includes a main spacer, a first sub-spacer and a second sub-spacer. The main spacer has a height greater than that of the first and second sub-spacers. The second sub-spacer has an area wider than that of the main spacer and the first sub-spacer.

17 Claims, 5 Drawing Sheets

(56) References Cited

FOREIGN PATENT DOCUMENTS

| | | | |
|---|---|---|---|
| KR | 100796126 B1 | 1/2008 |
| KR | 100814197 B1 | 3/2008 |
| KR | 1020110024597 A | 3/2011 |
| KR | 1020110133836 A | 12/2011 |

\* cited by examiner

DISPLAY APPARATUS HAVING SPACERS WITH DIFFERENT HEIGHTS AND DIFFERENT UPPER AND LOWER SURFACE AREAS

This application claims priority to Korean Patent Application No. 10-2012-0072340, filed on Jul. 3, 2012, and all the benefits accruing therefrom under 35 U.S.C. §119, the contents of which are hereby incorporated by reference.

BACKGROUND

1. Field

The disclosure relates to a display apparatus. More particularly, the disclosure relates to a display apparatus having improved durability.

2. Description of the Related Art

A display apparatus includes a display panel that displays an image, and a driver that drives the display panel. The display panel includes an upper substrate, a lower substrate facing the upper substrate, and an image display layer disposed between the upper substrate and the lower substrate. When the image display layer is a liquid crystal layer, an alignment layer is further disposed on the lower substrate to initially align liquid crystal molecules included in the liquid crystal layer.

The display panel further includes a spacer disposed between the upper substrate and the lower substrate to maintain a distance between the upper substrate and the lower substrate, and to ensure durability against external impacts.

In general, since the spacer is not attached to the lower substrate, the alignment layer adjacent to the spacer is scratched by the spacer when external impacts are applied to the display panel. Due to the damaged alignment layer, the liquid crystal molecules are not properly controlled. Consequently, a light leakage occurs in an area corresponding to the damaged portion of the alignment layer.

In addition, a contact area between the spacer and the upper substrate becomes small while the display panel is developed to provide high resolution. As a result, the display panel becomes more vulnerable to the external impacts.

SUMMARY

One or more exemplary embodiment of the invention provides a display apparatus having improved durability without lowering an opening ratio of a pixel.

One or more exemplary embodiments of the invention provide a display apparatus including a lower substrate, an upper substrate, an image display layer and a spacer. The lower substrate includes a gate line, a data line and a pixel area. The upper substrate faces the lower substrate. The spacer is disposed on the upper substrate and protruded toward the lower substrate.

The spacer includes a main spacer and a sub-spacer each including an upper surface having an upper surface area, and a lower surface having a lower surface area. A height of the sub-spacers is different from a height of the main spacer. The sub-spacers include a first sub-spacer and a second sub-spacer, and the upper surface area or the lower surface area of the second sub-spacers is different from the upper surface area or the lower surface area of the first sub-spacer, respectively.

The height of the main spacer may be greater than the height of the first and second sub-spacers.

The upper and lower surface areas of the second sub-spacer may be greater than the upper and lower surface areas of the first sub-spacer, respectively.

The upper substrate may include a first light blocking layer and a second light blocking layer. The first light blocking layer may cover the gate line and the data line. The second light blocking layer may partially overlap the first light blocking layer, and may cover a cross portion at which the gate line crosses the data line.

When viewed in a plan view, the main spacer and the second sub-spacer may be covered by the second light blocking layer, and the first sub-spacer may be covered by the first light blocking layer.

According to one or more exemplary embodiment described above, the display apparatus may prevent light leakage caused by an alignment layer damaged by external impacts.

In addition, one or more exemplary embodiment described above, the display apparatus may improve durability, e.g., compressive strength, without lowering the opening ratio of the pixel.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION

Figure 1:
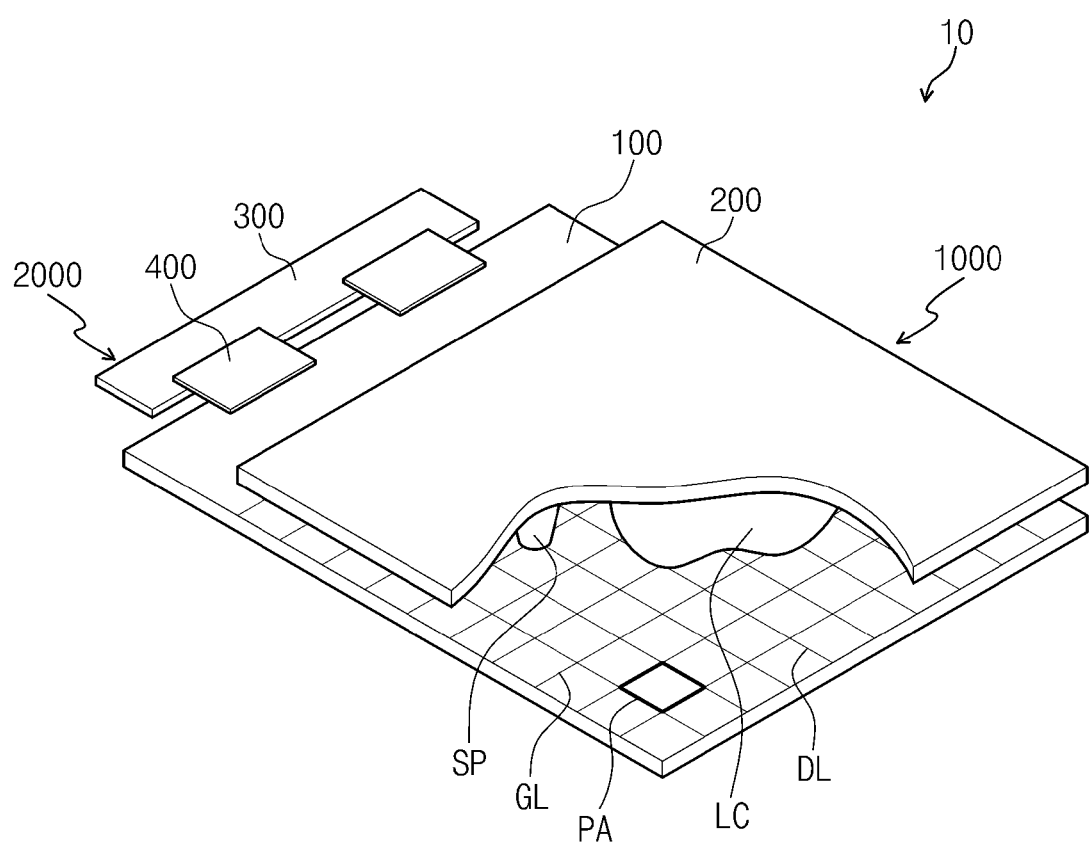
FIG. 1 is an exploded perspective view showing an exemplary embodiment of a display apparatus according to the invention.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" with respect to other elements or features would then be oriented "upper" the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

FIG. 1 is an exploded perspective view showing an exemplary embodiment of a display apparatus according to the invention.

Referring to FIG. 1, the display apparatus 10 includes a display panel 1000 that displays an image and a driver 2000 that drives the display panel 1000.

The display panel 1000 may be, but is not limited to, a liquid crystal display panel, a plasma display panel, an electrophoretic display panel or an electrowetting display panel. Hereinafter, as a representative example, the liquid crystal display panel will be described as the display panel 1000.

The display panel 1000 includes a lower substrate 100, an upper substrate 200 facing the lower substrate 100, and a liquid crystal layer LC disposed between the lower substrate 100 and the upper substrate 200.

The lower substrate 100 includes a gate line GL, a data line DL and a pixel area PA.

The gate line GL receives a gate signal and may be provided in a plural number. The data line DL receives a data signal and may be provided in a plural number. The pixel area PA may be provided in a plural number. The gate lines GL are insulated from and cross the data lines DL in a plan view of the display apparatus 10. In one exemplary embodiment, the pixel area PA may be defined by the gate lines GL and the data lines DL in a matrix form, but is not limited thereto or thereby. Pixels are arranged in the pixel areas PA, respectively. Each pixel may be defined as a portion of the display panel 1000 in a corresponding pixel area PA of the plural pixel areas PA in the point of view of a three-dimensional structure.

The lower substrate 100 further includes an alignment layer to pretilt liquid crystal molecules within the liquid crystal layer LC.

The upper substrate 200 accommodates the liquid crystal layer LC in cooperation with the lower substrate 100, and provides a color to light incident thereto.

The display panel 1000 further includes a spacer SP disposed between the lower substrate 100 and the upper substrate 200.

The spacer SP is disposed on the upper substrate 200 and is protruded toward the lower substrate 100. The spacer SP is used to maintain a distance between the lower substrate 100 and the upper substrate 200, and to improve durability of the display panel 1000 against external impacts. In FIG. 1, for the convenience of explanation, one spacer SP is shown, but the spacer SP may be provided in a plural number.

The driver 2000 includes a printed circuit board 300 and a tape carrier package 400. Although not shown in FIG. 1, the driver 2000 may further include a timing controller, a gate driver and a data driver.

The timing controller may be disposed on the printed circuit board 300.

The timing controller receives a control signal from an external source (not shown) and generates a gate control signal and/or a data control signal. The timing controller applies the gate control signal and the data control signal to the gate driver and the data driver, respectively. In addition, the timing controller receives an image data from an external source (not shown) and applies the image data to the data driver.

The gate control signal may include a vertical start signal that starts an operation of the gate driver and a gate clock signal that determines an output timing of a gate signal.

The data control signal may include a horizontal start signal that starts an operation of the data driver, a polarity inversion signal that controls a polarity of a data voltage output from the data driver, and a load signal that determines an output timing of the data voltage.

The tape carrier package 400 is electrically connected between the display panel 1000 and the printed circuit board 300.

The gate driver is disposed on the printed circuit board 300 or directly disposed on the display panel 1000. The gate driver is electrically connected to the gate line GL, and generates and applies the gate signal to the gate line GL.

The data driver is mounted on the tape carrier package 400 such as in a chip form. The data driver is electrically connected to the data line DL to apply the data voltage to the data line DL. The data driver receives the image data from the timing controller and converts the image data to the data voltage on the basis of a gamma voltage provided from a gamma voltage generator (not shown).

Figure 2:
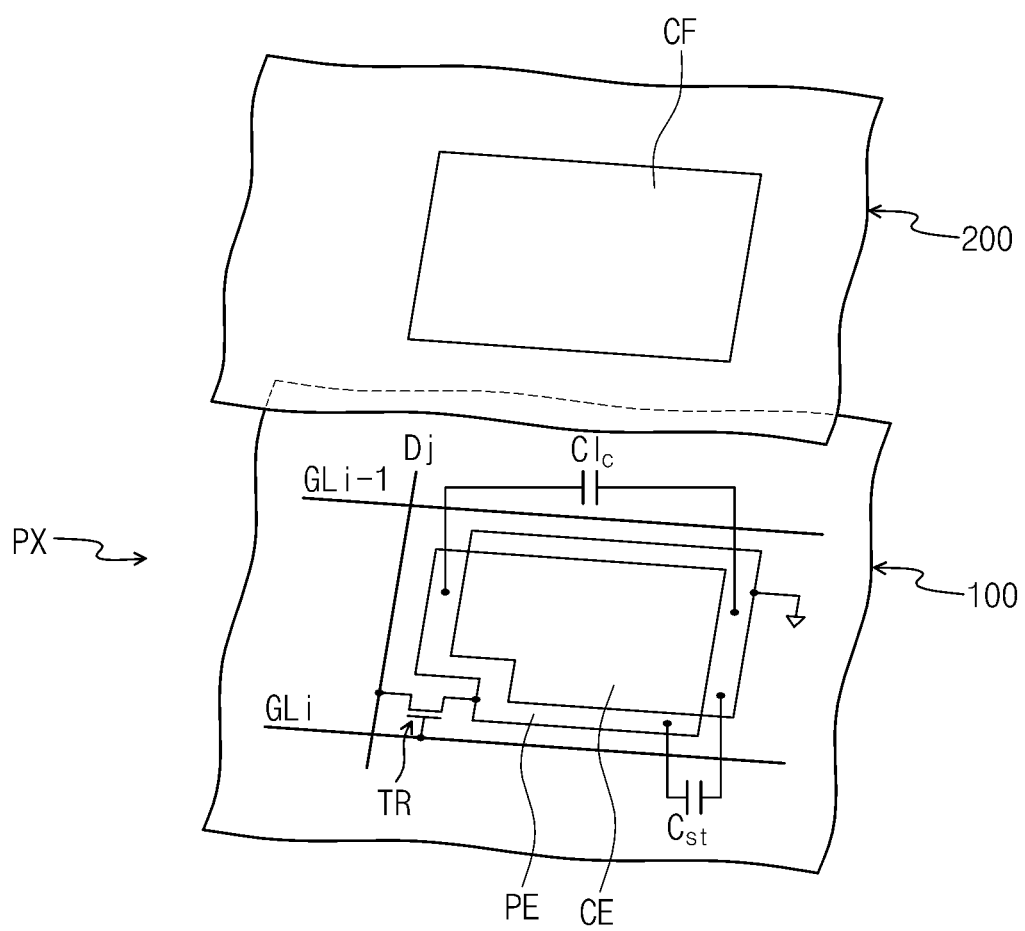
FIG. 2 is an equivalent circuit diagram showing an exemplary embodiment of one pixel of a display apparatus according to the invention.

FIG. 2 is an equivalent circuit diagram showing an exemplary embodiment of one pixel of a display apparatus according to the invention.

The pixels have the same structure and function, and thus one pixel PX will be described in detail as a representative example.

Referring to FIGS. 1 and 2, the pixel PX includes a thin film transistor TR, a pixel electrode PE, a common electrode CE, a liquid crystal capacitor Clc and a storage capacitor Cst.

The thin film transistor TR is a three-terminal device and includes a control terminal, an input terminal and an output terminal. The control terminal is connected an i-th gate line GLi (i is a natural number), the input terminal is connected a j-th data line DLj (j is a natural number), and the output terminal is connected to the pixel electrode PE. The thin film transistor TR applies the data voltage to the pixel electrode PE on the basis of the gate signal.

The pixel electrode PE is disposed on the lower substrate 100 and is arranged in an area of the pixel area PA except for an area in which the thin film transistor TR is disposed. Although not shown in figures, the pixel electrode PE may include a plurality of slits extending therethrough.

The common electrode CE is disposed on the lower substrate 100 and is overlapped with the pixel electrode PE while interposing an insulating layer (not shown) therebetween. The common electrode CE is disposed on or under the pixel electrode PE. The common electrode CE receives a common voltage.

The liquid crystal capacitor Clc utilizes the pixel electrode PE and the common electrode CE as two terminals thereof, and the liquid crystal layer LC disposed between the pixel electrode PE and the common electrode serves as a dielectric substance. The liquid crystal capacitor Clc is charged with a voltage corresponding to an electric potential difference between the data voltage and the common voltage.

The storage capacitor Cst utilizes the pixel electrode PE and the common electrode CE as two terminals thereof, and an insulating layer (not shown) disposed between the pixel electrode PE and the common electrode serves as a dielectric substance. The storage capacitor Cst acts as an auxiliary capacitor for the liquid crystal capacitor Clc.

The liquid crystal layer LC transmits or blocks light incident thereto in accordance with a horizontal electric field generated by voltages respectively applied to the pixel electrode PE and the common electrode CE.

In FIG. 2, the pixel electrode PE and the common electrode CE are disposed on the same lower substrate 100, but should not be limited thereto or thereby. In an alternative exemplary embodiment, the pixel electrode PE and the common electrode CE may be respectively disposed on the lower substrate 100 and the upper substrate 200. In this case, the liquid crystal layer LC transmits or blocks light incident thereto in accordance with a vertical electric field generated by voltages respectively applied to the pixel electrode PE and the common electrode CE on different substrates.

Figure 3:
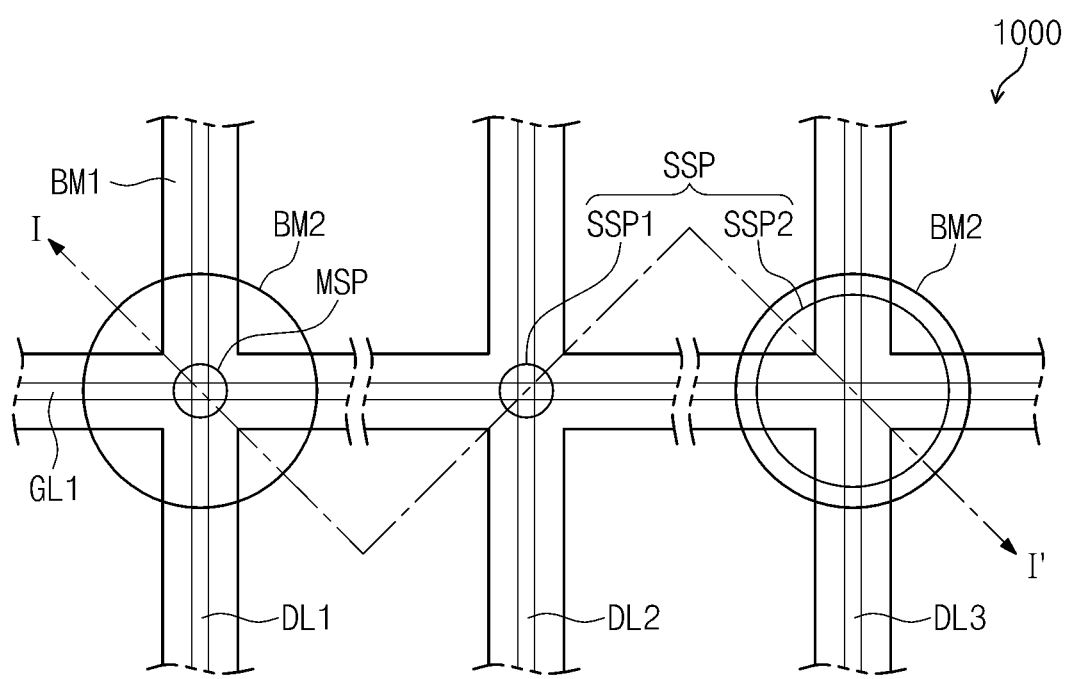
FIG. 3 is a plan view showing an exemplary embodiment of a relationship between a gate line, a data line, a light blocking layer and a spacer of a display apparatus according to the invention.
Figure 4:
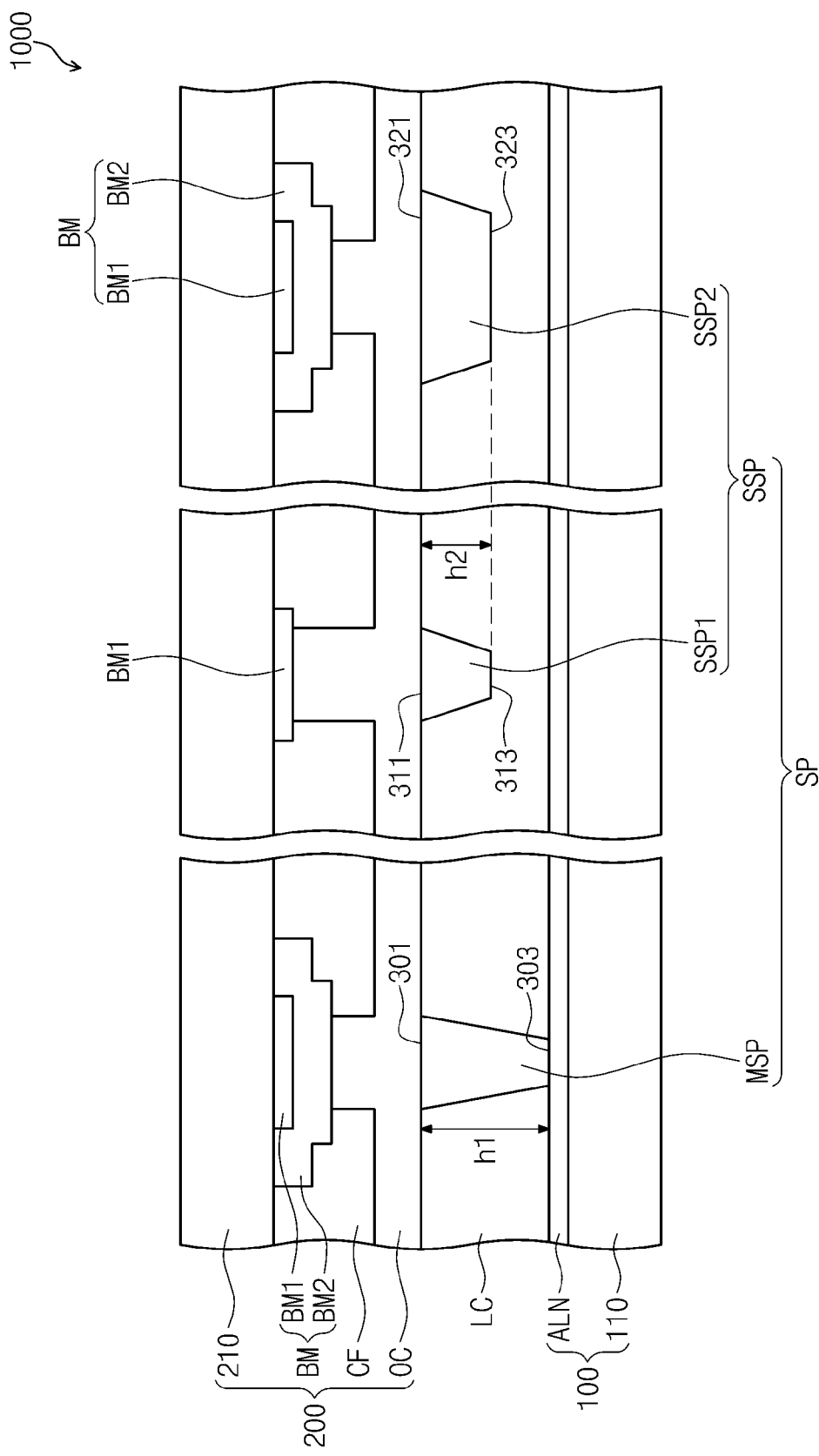
FIG. 4 is a cross-sectional view taken along line I-I' of FIG. 3.

FIG. 3 is a plan view showing an exemplary embodiment of a relationship between a gate line, a data line, a light blocking layer and a spacer, and FIG. 4 is a cross-sectional view taken along line I-I' of FIG. 3.

FIG. 3 shows one gate line GL1 and successive three data lines DL1, DL2 and DL3 as an example. In addition, for the convenience of explanation, the detailed structure of the lower substrate 100 is omitted in FIG. 4 except for an alignment layer ALN and a base substrate 110.

Referring to FIGS. 3 and 4, the upper substrate 200 includes an insulating substrate 210, a light blocking layer BM, a color filter CF and a planarization layer OC.

The insulating substrate 210 may include a transparent insulating material.

The light blocking layer BM includes a first light blocking layer portion BM1 and a second light blocking layer portion BM2. In one exemplary embodiment, the light blocking layer BM has a black color so as to absorb the light incident to the light blocking layer BM.

The first light blocking layer portion BM1 is disposed on the insulating substrate 210. The first light blocking layer portion BM1 covers (e.g., overlaps) the gate line GL1 and the data lines DL1, DL2, and DL3 when viewed in a plan view. The first light blocking layer portion BM1 reduces or effectively prevents the gate line GL1 and the data lines DL1, DL2, and DL3 from being perceived outside the display panel 1000, and also reduces or effectively prevents light leakage due to a parasitic capacitance around the gate line GL1 and the data lines DL1, DL2, and DL3. Although not shown in figures, the first light blocking layer portion BM1 may further cover the thin film transistor TR as shown in FIG. 2 when viewed in the plan view.

The second light blocking layer portion BM2 is disposed on the insulating substrate 210 to partially overlap with the first light blocking layer portion BM1. The second light blocking layer portion BM2 covers a cross portion in which the gate line GL1 crosses the data lines DL1, DL2 and DL3.

The second light blocking layer portion BM2 has a substantially circular shape when viewed in the plan view, but is not be limited to the circular shape. That is, the second light blocking layer portion BM2 may have various shapes, such as a rectangular shape, an oval shape, a triangular shape, etc., to cover the cross portion.

The second light blocking layer portion BM2 has a diameter greater than a width of the first blocking layer portion BM1. Preferably, the second light blocking layer portion BM2 has the diameter greater than one and a half times the width of the first light blocking layer portion BM1, and smaller than two times the width of the first light blocking layer portion BM1. Accordingly, the second light blocking layer portion BM2 covers the first light blocking layer portion BM1 and a peripheral area of the first light blocking layer portion BM1 in the cross portion.

The second light blocking layer portion BM2 is provided in a plural number. The second light blocking layer portion BM2 may be at every cross portion, but is not limited thereto or thereby. In FIG. 3, the second light blocking layer portion BM2 is at the cross portion in which the gate line GL1 crosses the data line DL1 and at the cross portion in which the gate line GL1 crosses the data line DL3, while not at the cross portion in which the gate line GL1 crosses the data line DL2. The number of the second light blocking layer portion BM2 will be described in detail later.

In addition, the first light blocking layer portion BM1 and the second light blocking layer portion BM2 are separate from each other in FIGS. 3 and 4, but the first light blocking layer portion BM1 and the second light blocking layer portion BM2 may be integral with each other so as to form a single, unitary, indivisible light blocking layer BM. Where the first light blocking layer portion BM1 and the second light blocking layer portion BM2 may be integral with each other, the planar and/or cross-sectional shape of the light blocking layer BM is changed according to the cross portion relative to other portions of the display panel 1000.

The color filter CF is disposed on the insulating substrate 210 which includes the light blocking layer BM. The color filter CF allows the light passing through the liquid crystal layer LC to have a specific color. The color filter CF may be, but is not limited to, a red color filter R, a green color filter or a blue color filter B. As shown in FIG. 2, the color filter CF is provided to correspond to each pixel PX, but is not limited thereto or thereby.

The planarization layer OC is disposed on the color filter CF to planarize the upper substrate 200.

The spacer SP is disposed on the upper substrate 200 and is protruded toward the lower substrate 100.

Hereinafter, a surface of the spacer SP, which makes contact with the upper substrate 200 will be referred to an upper surface and the other surface of the spacer SP, which is opposite to the upper surface, will be referred to a lower surface.

The upper surface of the spacer SP has a planar area greater than that of the lower surface of the spacer SP. In one exemplary embodiment, a difference in the planar areas of the upper and lower surfaces is due to a different etch rate of the upper surface from that of the lower surface when a thin layer deposited to form the spacer SP on the upper substrate 200 is etched.

The upper surface and the lower surface of the spacer SP have a circular shape in the plan view, and the spacer SP has a circular truncated cone shape in a cross-sectional view, but should not be limited thereto or thereby. In alternative exemplary embodiments, the upper and lower surfaces of the spacer SP may be, but are not limited to, a rectangular shape, an oval shape or a triangular shape. The spacer SP may be, but is not limited to, a rectangular truncated cone shape, an oval truncated cone shape or a triangular truncated cone shape. Hereinafter, the spacer SP having the circular truncated cone shape will be described in detail as a representative example.

The spacer SP includes a main spacer MSP and a sub-spacer SSP. The sub-spacer SSP may be provided in plural. The plural sub-spacers SSP include a first sub-spacer SSP1 and a second sub-spacer SSP2.

The main spacer MSP is disposed to overlap with the first light blocking layer portion BM1 and the second light blocking layer portion BM2 when viewed in a plan view. The main spacer MSP is located at a position corresponding to a first cross portion of the gate line GL1 and the data line DL1 and covered by the second light blocking layer portion BM2.

The main spacer MSP has a first height h1. The first height h1 corresponds to a cell gap between the lower substrate 100 and the upper substrate 200. Accordingly, an upper surface 301 of the main spacer MSP makes contact with a lower surface of the upper substrate 200, and a lower surface 303 of the main spacer MSP makes contact with an upper surface of the lower substrate 100. The main spacer MSP maintains the cell gap between the lower substrate 100 and the upper substrate 200.

The main spacer MSP is generally covered by the first light blocking layer portion BM1 in the first cross portion, but the lower surface 303 of the main spacer MSP may make contact with the lower substrate 100 at a position deviated from the first cross portion by external impacts since the lower surface 303 of the main spacer MSP is not attached to the lower substrate 100. In this case, the alignment layer ALN is scratched by the main spacer MSP around the first cross portion, and thus the light leakage occurs around the first cross portion by the scratched alignment layer ALN. However, although the main spacer MSP is not completely covered by the first light blocking layer portion BM1, the main spacer MSP is completely covered by the second light blocking layer portion BM2, so that the light leakage perceived by a viewer may be reduced or effectively prevented.

The main spacer MSP is provided in a plural number, but the number of the main spacer MSP is smaller than the number of the second light blocking layer portions BM2. The number of the main spacer MSP will be described in detail later.

The first sub-spacer SSP1 is disposed to overlap with the first light blocking layer portion BM1 when viewed in a plan view. The first sub-spacer SSP1 may overlap only the first light blocking layer portion BM1 of the light blocking layer BM, but is not limited thereto or thereby. In detail, the first sub-spacer SSP1 is located at a position corresponding to a second cross portion in which the gate line GL1 crosses the data line DL2, and is covered by the first light blocking layer portion BM1.

The first sub-spacer SSP1 has a second height h2 smaller than the first height h1. The second height h2 is smaller than the first height h1 by about 0.5 micrometers to about 0.7 micrometers. Thus, an upper surface 311 of the first sub-spacer SSP1 makes contact with the lower surface of the upper substrate 200 and a lower surface 313 of the first sub-spacer SSP1 is spaced apart from the lower substrate 100. The first sub-spacer SSP1 improves durability of the display panel 1000 against the external impacts, e.g., compressive strength.

The first sub-spacer SSP1 is provided in a plural number, and the number of the first sub-spacers SSP1 will be described in detail later.

The second sub-spacer SSP2 is disposed to overlap with the first light blocking layer portion BM1 and the second light blocking layer portion BM2 when viewed in a plan view. The second sub-spacer SSP2 is located at a position corresponding to a third cross portion, in which the gate line GL1 crosses the data line DL3, and is covered by the second light blocking layer portion BM2.

The second sub-spacer SSP2 has a diameter greater than the width of the first light blocking layer portion BM1 and smaller than a diameter of the second light blocking layer portion BM2. Thus, the second sub-spacer SSP2 is completely covered by the second light blocking layer portion BM2 even though the second sub-spacer SSP2 is partially covered by the first light blocking layer portion BM1. The diameter of the second sub-spacer SSP2 is obtained by subtracting a process margin from the diameter of the second light blocking layer portion BM2. In one exemplary embodiment, for instance, when assuming that the diameter of the second light blocking layer portion BM2 is about 45 micrometers and the process margin is about 10 micrometers, the diameter of the second sub-spacer SSP2 may be about 35 micrometers.

The second sub-spacer SSP2 has the second height h2. Thus, an upper surface 321 of the second sub-spacer SSP2 makes contact with the lower surface of the upper substrate 200 and a lower surface 323 of the second sub-spacer SSP2 is spaced apart from the upper surface of the lower substrate 100. The second sub-spacer SSP2 serves as the same function as the first sub-spacer SSP1 to support the first sub-spacer SSP1 in improving durability of the display panel 1000 against the external impacts, e.g., compressive strength.

The upper surface 321 of the second sub-spacer SSP2 has an area greater than that of the upper surface 311 of the first sub-spacer SSP1. In one exemplary embodiment, as an example, a diameter of the upper surface 321 of the second sub-spacer SSP2 may be about 35 micrometers and a diameter of the upper surface 311 of the first sub-spacer SSP1 may be about 12 micrometers. In addition, the lower surface 323 of the second sub-spacer SSP2 has an area greater than that of the lower surface 313 of the first sub-spacer SSP1.

The second sub-spacer SSP2 is provided in a plural number, and the number of the second sub-spacers SSP2 will be described in detail later.

Hereinafter, an overall planar area of the lower surface of the upper substrate 200 will be referred to as a first area, and a sum of the planar area of the upper surface 301 of each of the main spacers MSP, the planar area of the upper surface 311 of each of the first sub-spacers SSP1 and the planar area of the upper surface 321 of each of the second sub-spacers SSP2 will be referred to as a second area. In addition, a sum of the planar area of the lower surface 303 of each of the main spacers MSP, the planar area of the lower surface 313 of each of the first sub-spacers SSP1, and the area of the lower surface 323 of each of the second sub-spacers SSP2 will be referred to as a third area.

A ratio of the second area to the first area is referred to as an upper area ratio and a ratio of the third area to the first area is referred to as a lower area ratio. The upper area ratio expressed as a percentage is equal to or greater than about 3.5% and equal to or smaller than about 5.5%, and the lower area ratio expressed as a percentage is equal to or greater than about 0.6% and equal to or smaller than about 0.9%.

As the upper area ratio and the lower area ratio are increased, the compressive strength of the display panel 1000 is improved. A conventional display panel has the upper area ratio of about 2.5% and the lower area ratio of about 0.4%. The conventional display panel has low ratios because the conventional display panel does not include the second sub-spacer SSP2 included in the exemplary embodiment of the display panel 1000 according to the invention. Therefore, the display apparatus of the invention may have superior durability and compressive strength when compared to the conventional display apparatus.

Figure 5:
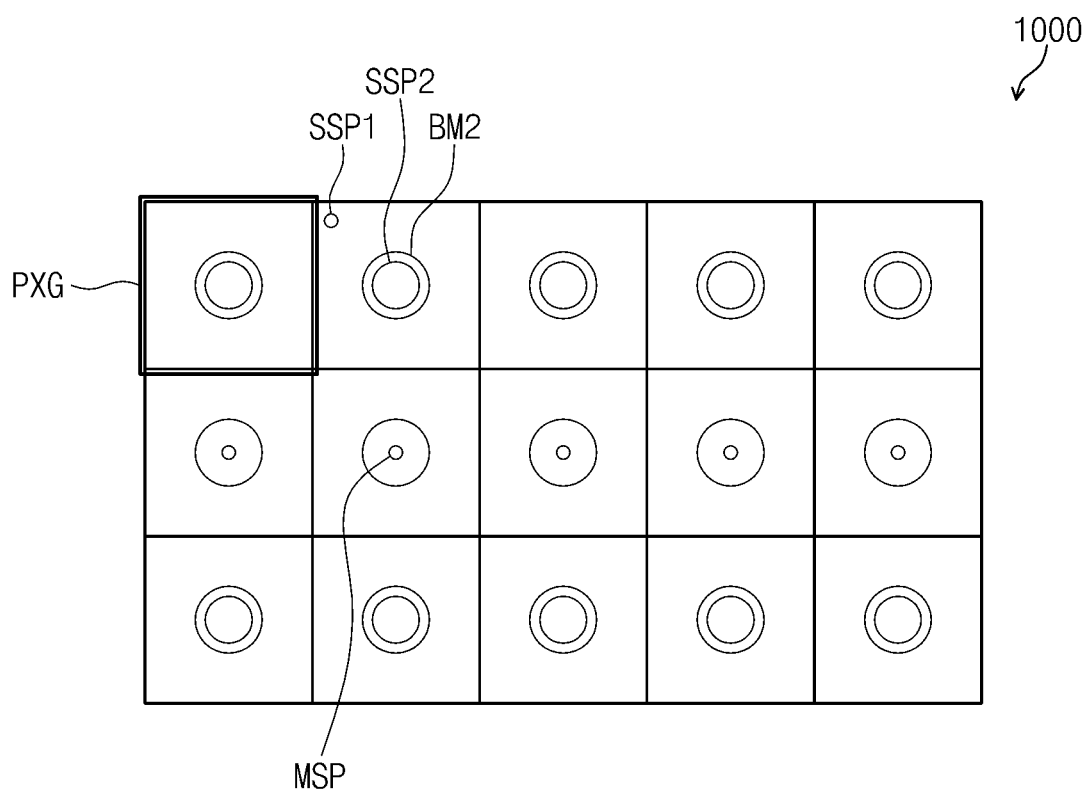
FIG. 5 is a plan view showing an exemplary embodiment of a number of second light blocking layers, main spacers and second sub-spacers of a display apparatus according to the invention.

FIG. 5 is a plan view explaining an exemplary embodiment of a number of the second light blocking layers, the main spacers and the second sub-spacers. In FIG. 5, the display panel 1000 includes fifteen pixel groups PXG arranged in three rows by five columns, and each pixel group PXG includes twelve pixels.

In addition, the relationship between the number of the second light blocking layers, the number of the main spacers and the number of the second sub-spacers will be described with reference to FIG. 5 on the assumption that the number of the cross portions of the gate lines and the data lines is equal to the number of the pixels.

The number of the second light blocking layer portions BM2 is equal to or greater than one-eighteenth the total number of the pixels and equal to or smaller than one-twelfth the total number of the pixels. As the number of the second light blocking layer portions BM2 is increased, the opening ratio of the pixel is decreased. On the contrary, as the number of the second light blocking layer portions BM2 is decreased, the second light blocking layer portion BM2 is perceived by the viewer as a dark spot. Since the opening ratio of the pixel and visibility of the dark spots are inversely related to each other, the number of the second light blocking layers BM2 is required to be properly managed in consideration of the contradicting relationship between the opening ratio of the pixel and visibility of the dark spots.

According to an experimental result, when the number of the second light blocking layers BM2 is equal to or greater than one-eighteenth the total number of the pixels and equal to or smaller than one-twelfth the total number of the pixels, the second light blocking layer portion BM2 is not perceived by the viewer and an opening ratio of the pixel, which is sufficient to display the image, is obtained.

Hereinafter, the one-twelfth second light blocking layer portions BM2 with respect to the total number of the pixels will be described as an example.

Since there are one hundred eighty total pixels, one-twelfth of the total number of pixels is fifteen. Referring to FIG. 5, one second light blocking layer portion BM2 is disposed in every pixel group PXG each configured to include twelve pixels. FIG. 5 shows fifteen second light blocking layers portions BM2.

The number of the main spacers MSP may be one thirty-sixth ($\frac{1}{36}^{th}$) the total number of the pixels. In a case that the number of the total pixels is one hundred eighty, the number of the main spacers MSP is five. As shown in FIG. 5, one main spacer MSP is disposed at every pixel group PXG for one of three rows of pixel groups PXG, for a total of five main spacers MSP, and the main spacer MSP may be covered by the second light blocking layer portion BM2.

The number of the second sub-spacers SSP2 is obtained by subtracting the total number of the main spacers MSP from the total number of the second light blocking layers portion BM2. As shown in FIG. 5, the total number of the second light blocking layer portion BM2 is fifteen and the total number of the main spacer MSP is five, so that the number of the second sub-spacers SSP2 is ten. The second sub-spacer SSP2 is covered by the second light blocking layer portion BM2.

That is, the second light blocking layer portion BM2 is overlapped with the main spacer MSP or the second sub-spacer SSP2.

The number of the first sub-spacers SSP1 is obtained by subtracting the total number of the main spacers MSP and the total number of the second sub-spacers SSP2 from the total number of the pixels. Although not shown in FIG. 5, the total number of the pixels is one hundred eighty, the number of the main spacers MSP is five and the number of the second spacers SSP2. Thus, the number of the first sub-spacers SSP1 may be one hundred sixty five. FIG. 5 shows only one first sub-spacer SSP1 for convenience.

FIG. 5 shows only the total number of the main spacers MSP, the total number of the first sub-spacers SSP1 and the total number of the second sub-spacers SSP2 excluding specific arrangements of the main spacers MSP, the first sub-spacers SSP1 and the second sub-spacers SSP2 with respect to each other. Accordingly, the arrangements of the main spacers MSP, the first sub-spacers SSP1 and the second sub-spacers SSP2 should not be limited to arrangements shown in FIG. 5.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display apparatus comprising:
    a lower substrate comprising a gate line, a data line crossing the gate line, and a pixel area;
    an upper substrate which faces the lower substrate;
    an image display layer between the lower substrate and the upper substrate;
    a spacer on the upper substrate and protruded toward the lower substrate,
    a first light blocking layer elongated in extension directions of the gate line and data line to cover the gate line and the data line; and
    a second light blocking layer which overlaps a portion of the elongated first light blocking layer at a cross portion at which the gate line and the data line cross each other, and is larger than the first light blocking layer at the cross portion in a plan view,
    wherein
    the spacer comprises a main spacer and sub-spacers, each comprising an upper surface having an upper surface area, and a lower surface having a lower surface area,
    a height of the sub-spacers is different from a height of the main spacer, and
        the sub-spacers comprise a first sub-spacer and a second sub-spacer, and the upper surface area of the second sub-spacer is different from the upper surface area of the first sub-spacer or the lower surface area of the second sub-spacer is different from the lower surface area of the first sub-spacer.

2. The display apparatus of claim 1, wherein the second light blocking layer has a circular shape in the plan view.

3. The display apparatus of claim 2, wherein a diameter of the second light blocking layer is greater than a width of the first light blocking layer at the cross portion in the plan view.

4. The display apparatus of claim 1, further comprising a plurality of second light blocking layers and a plurality of pixel areas,
   wherein a number of the second light blocking layers is equal to or greater than one-eighteenth a total number of the pixel areas and is equal to or smaller than one-twelfth the total number of the pixel areas.

5. The display apparatus of claim 4, wherein the upper and lower surface areas of the second sub-spacer are greater than the upper and lower surface areas of the first sub-spacer, respectively.

6. The display apparatus of claim 5, wherein
   the main spacer contacts the upper substrate and the lower substrate, and
   the sub-spacers contact the upper substrate and are spaced apart from the lower substrate.

7. The display apparatus of claim 5, wherein
   the second light blocking layers overlap the main spacer and the second sub-spacer, and the first light blocking layer overlaps the first sub-spacer, in the plan view.

8. The display apparatus of claim 7, further comprising a plurality of main spacers,
   wherein a number of the main spacers is one thirty-sixth the total number of the pixel areas.

9. The display apparatus of claim 8, further comprising a plurality of second sub-spacers,
   wherein a number of the second sub-spacers is the number of the main spacers subtracted from the number of the second light blocking layers.

10. The display apparatus of claim 9, further comprising a plurality of first sub-spacers,
    wherein a number of the first sub-spacers is the number of the main spacers and the number of the second sub-spacers, subtracted from the total number of the pixel areas.

11. The display apparatus of claim 7, wherein
    the upper surface of each of the main spacer, the first sub-spacer and the second sub-spacer contacts a lower surface of the upper substrate, and
    the upper surface area of the main spacer, the first sub-spacer and the second sub-spacer is greater than the lower surface area thereof, respectively.

12. The display apparatus of claim 11, wherein,
    when an area of the lower surface of the upper substrate is referred to as a first area, and a sum of the upper surface areas of each of the main spacer, the first sub-spacer and the second sub-spacer is referred to as a second area,
    the second area is equal to or greater than about 3.5% and equal to or smaller than 5.5% of the first area.

13. The display apparatus of claim 11, wherein,
    when an area of the lower surface of the upper substrate is referred to as a first area, and a sum of the lower surface areas of each of the main spacer, the first sub-spacer and the second sub-spacer is referred to as a third area,
    the third area is equal to or greater than about 0.6% and equal to or smaller than about 0.9% of the first area.

14. The display apparatus of claim 1, wherein the height taken from the upper surface to the lower surface of the main spacer is greater than the height taken from the upper surface to the lower surface of the sub-spacers.

15. The display apparatus of claim 1, wherein the lower substrate further comprises:
    a thin film transistor connected to the gate line and the data line;
    a pixel electrode connected to the thin film transistor;
    a common electrode partially overlapped with the pixel electrode.

16. The display apparatus of claim 15, wherein the image display layer comprises liquid crystal molecules, and transmits or blocks a light incident thereto in accordance with a horizontal electric field generated by voltages respectively applied to the pixel electrode and the common electrode.

17. A method of forming a display apparatus, the method comprising:
    providing a lower substrate comprising a gate line, a data line crossing the gate line, and a pixel area;
    providing an upper substrate which faces the lower substrate;
    providing an image display layer between the lower substrate and the upper substrate;
    providing a first light blocking layer elongated in extension directions of the gate line and data line to cover the gate line and the data line; and
    providing a second light blocking layer which overlaps a portion of the elongated first light blocking layer at a cross portion at which the gate line and the data line cross each other, and is larger than the first light blocking layer at the cross portion in a plan view, and
    providing a spacer on the upper substrate and protruded toward the lower substrate,
    wherein
    the spacer comprises a main spacer and sub-spacers, each comprising an upper surface having an upper surface area, and a lower surface having a lower surface area,
    a height of the sub-spacers different from a height of the main spacer, and
    the sub-spacers comprise a first sub-spacer and a second sub-spacer, and the upper surface area of the second sub-spacer is different from the upper surface area of the first sub-spacer, or the lower surface area of the second sub-spacer is different from the lower surface area of the first sub-spacer.

* * * * *